US010952006B1

(12) United States Patent
Krol et al.

(10) Patent No.: US 10,952,006 B1
(45) Date of Patent: Mar. 16, 2021

(54) ADJUSTING RELATIVE LEFT-RIGHT SOUND TO PROVIDE SENSE OF AN AVATAR'S POSITION IN A VIRTUAL SPACE, AND APPLICATIONS THEREOF

(71) Applicant: Katmai Tech Holdings LLC, Anchorage, AK (US)

(72) Inventors: Gerard Cornelis Krol, Leiden (NL); Erik Stuart Braund, Saugerties, NY (US)

(73) Assignee: Katmai Tech Holdings LLC, Anchorage, AK (US)

( * ) Notice: Subject to any disclaimer, the term of this patent is extended or adjusted under 35 U.S.C. 154(b) by 0 days.

(21) Appl. No.: 17/075,390

(22) Filed: Oct. 20, 2020

(51) Int. Cl.
*H04R 5/02* (2006.01)
*H04N 7/14* (2006.01)
(Continued)

(52) U.S. Cl.
CPC .............. *H04S 7/302* (2013.01); *G06F 3/165* (2013.01); *H04N 7/157* (2013.01)

(58) Field of Classification Search
CPC ..... G06F 3/165; G06F 17/3028; H04N 7/147; H04N 2007/145; H04N 5/272; H04N 7/14; H04N 7/141; H04N 7/142; H04N 7/144; H04N 7/148; H04N 7/15; H04N 7/152; H04N 7/155; H04N 7/157; H04N 7/23206; H04S 7/302; G01S 5/0072; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572;
(Continued)

(56) References Cited

U.S. PATENT DOCUMENTS 6,215,498 B1  4/2001  Filo et al.
6,559,863 B1  5/2003  Megiddo
(Continued)

FOREIGN PATENT DOCUMENTS

CN    103580881 A    2/2014
CN    105487657 A    4/2016
(Continued)

OTHER PUBLICATIONS

Dipaola, S. and Collins, D., "A 3D Virtual Environment for Social Telepresence", Mar. 2002; 6 pages.
(Continued)

*Primary Examiner* — Khai N. Nguyen
(74) *Attorney, Agent, or Firm* — Sterne, Kessler, Goldstein & Fox P.L.L.C.

(57) ABSTRACT

Disclosed herein is a web-based videoconference system that allows for video avatars to navigate within the virtual environment. The system has a presented mode that allows for a presentation stream to be texture mapped to a presenter screen situated within the virtual environment. The relative left-right sound is adjusted to provide sense of an avatar's position in a virtual space. The sound is further adjusted based on the area where the avatar is located and where the virtual camera is located. Video stream quality is adjusted based on relative position in a virtual space. Three-dimensional modeling is available inside the virtual video conferencing environment.

21 Claims, 14 Drawing Sheets

(51) Int. Cl.
*H04S 7/00* (2006.01)
*G06F 3/16* (2006.01)
*H04N 7/15* (2006.01)

(58) Field of Classification Search
CPC ......... H04M 2201/40; H04M 2250/52; H04M 3/4936; H04M 3/5191; H04W 4/18; H04W 4/185
USPC ..... 381/310; 348/14.01, 14.02, 14.03, 14.04, 348/14.05, 14.06, 14.07, 14.08, 14.09, 348/14.1, 14.11, 14.12, 14.13, 14.14, 348/15.15, 14.16; 382/275; 379/265.03; 455/414.1, 566; 704/270
See application file for complete search history.

(56) References Cited

U.S. PATENT DOCUMENTS

| | | | |
|---|---|---|---|
| 6,572,475 B1* | 6/2003 | Okabe | A63F 13/10 463/30 |
| 6,583,808 B2 | 6/2003 | Boulanger et al. | |
| 6,853,398 B2 | 2/2005 | Malzbender et al. | |
| 7,006,616 B1* | 2/2006 | Christofferson | H04L 65/4038 379/202.01 |
| 7,197,126 B2 | 3/2007 | Kanada | |
| 7,346,654 B1 | 3/2008 | Weiss | |
| 7,634,073 B2 | 12/2009 | Kanada | |
| 7,840,668 B1 | 11/2010 | Sylvain et al. | |
| 8,072,479 B2 | 12/2011 | Valliath et al. | |
| 8,145,998 B2* | 3/2012 | Leahy | H04L 67/306 715/706 |
| 8,191,001 B2* | 5/2012 | Van Wie | G06F 16/9537 715/757 |
| 8,279,254 B2 | 10/2012 | Goose et al. | |
| 8,340,726 B1* | 12/2012 | Fujisaki | H04M 1/72572 455/566 |
| 8,403,751 B2 | 3/2013 | Boustead et al. | |
| 8,520,872 B2 | 8/2013 | Jang et al. | |
| 8,620,009 B2 | 12/2013 | Zhang et al. | |
| 8,732,593 B2* | 5/2014 | Van Wie | G06Q 10/10 715/757 |
| 8,806,354 B1* | 8/2014 | Hyndman | G06F 3/04883 715/753 |
| 9,041,764 B2 | 5/2015 | Wang et al. | |
| 9,060,246 B1* | 6/2015 | Fujisaki | H04M 1/72522 |
| 9,218,685 B2 | 12/2015 | Piemonte et al. | |
| 9,241,060 B1* | 1/2016 | Fujisaki | G06F 3/0482 |
| 9,305,319 B2 | 4/2016 | Maor et al. | |
| 9,384,594 B2 | 7/2016 | Maciocci et al. | |
| 9,411,490 B2* | 8/2016 | Van Wie | H04L 12/1822 |
| 9,420,229 B2 | 8/2016 | Pourashraf et al. | |
| 9,565,316 B2 | 2/2017 | Gleim | |
| 9,607,428 B2 | 3/2017 | Li | |
| 9,656,168 B1 | 5/2017 | Bear et al. | |
| 9,661,274 B2 | 5/2017 | Kubota et al. | |
| 9,743,044 B2 | 8/2017 | Safaei et al. | |
| 9,910,509 B2 | 3/2018 | Markovic et al. | |
| 10,013,805 B2 | 7/2018 | Barzuza et al. | |
| 10,155,164 B2 | 12/2018 | Boustead et al. | |
| 10,175,846 B1* | 1/2019 | Fujisaki | H04M 1/72572 |
| 10,304,238 B2 | 5/2019 | Cooper et al. | |
| 10,304,239 B2 | 5/2019 | Gorur Sheshagiri et al. | |
| 10,334,384 B2 | 6/2019 | Sun et al. | |
| 10,356,216 B2 | 7/2019 | Khalid et al. | |
| 10,503,356 B1* | 12/2019 | Fujisaki | H04M 19/04 |
| 10,542,238 B2* | 1/2020 | Bergmann | H04L 67/38 |
| 10,573,071 B2 | 2/2020 | Sun et al. | |
| 10,609,334 B2 | 3/2020 | Li | |
| 10,679,411 B2 | 6/2020 | Ziman | |
| 2002/0158873 A1 | 10/2002 | Williamson | |
| 2007/0274528 A1 | 11/2007 | Nakamoto et al. | |
| 2009/0113314 A1 | 4/2009 | Dawson et al. | |
| 2009/0254843 A1* | 10/2009 | Van Wie | G06F 3/04815 715/757 |
| 2011/0072367 A1 | 3/2011 | Bauer | |
| 2012/0204119 A1* | 8/2012 | Lefar | G06Q 10/0631 715/756 |
| 2013/0321564 A1 | 12/2013 | Smith et al. | |
| 2014/0058807 A1 | 2/2014 | Altberg et al. | |
| 2014/0237393 A1* | 8/2014 | Van Wie | H04L 65/403 715/757 |
| 2015/0302661 A1 | 10/2015 | Miller | |
| 2016/0134840 A1* | 5/2016 | McCulloch | G06K 9/00208 348/14.03 |
| 2016/0342303 A1* | 11/2016 | Van Wie | G06F 16/9537 |
| 2017/0103440 A1* | 4/2017 | Xing | G06F 3/04883 |
| 2017/0351476 A1 | 12/2017 | Yoakum | |
| 2019/0098255 A1* | 3/2019 | Bergmann | G06Q 10/1093 |
| 2019/0199993 A1 | 6/2019 | Babu et al. | |
| 2019/0310761 A1 | 10/2019 | Agarawala | |
| 2019/0320144 A1 | 10/2019 | Tong et al. | |
| 2019/0354170 A1 | 11/2019 | Rosedale | |
| 2019/0371060 A1 | 12/2019 | Energin et al. | |
| 2020/0008003 A1 | 1/2020 | Thompson et al. | |
| 2020/0037061 A1 | 1/2020 | Jeon et al. | |
| 2020/0098191 A1 | 3/2020 | McCall | |
| 2020/0221247 A1 | 7/2020 | Latypov et al. | |
| 2020/0322575 A1* | 10/2020 | Valli | G03B 21/00 |
| 2020/0329214 A1* | 10/2020 | Ahn | G06Q 50/08 |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

EngageVR, "Next Generation Education, Training, Meetings & Events," accessed at https://engagevr.io/, accessed on Oct. 28, 2020; 6 pages.

Event Farm, "Bring Your Events Into the Virtual World," accessed at https://eventfarm.com/the-echo, accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersivc.ly/best-vr-apps-productive-remote-meetings/, accessed on Oct. 28, 2020; 10 pages.

Leung, W. and Chen, T., "Networked Collaborative Environment With Animated 3D Avatars, Dept. of Electrical and Computer Engineering Carnegie Mellon University," Aug. 6, 2002; 3 pages.

Leung, W. et al.., "Networked Intelligent Collaborative Environment (NetICE), Multimedia and Expo 2000," Aug. 6, 2002; 4 pages.

Leung, W. and Chen, T., "A Multi-User 3-D Virtual Environment With Interactive Collaboration and Shared Whiteboard Technologies, Kluwer Academic Publishers," Jul. 23, 2003, 17 pages.

Lin, J. et al., "A Virtual Reality Platform for Dynamic Human-Scene Interaction," Dec. 2016; 4 pages.

Nishihara, R. and Okubo, M., "A Study on Personal Space in Virtual Space Based on Personality," 2015; 8 pages.

Sandre, A., "Is Virtual Reality the Future of Video Conferencing?" May 15, 2020; 7 pages.

(56) References Cited

OTHER PUBLICATIONS

De Sousa, A., "Remote Proxemics for Collaborative Virtual Environments," Nov. 2014; 10 pages.
Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.
Teooh, "Virtual Spaces for Real Communities," accessed at https://teooh.com/, accessed on Oct. 28, 2020; 3 pages.
VirBELA Media, "Team Suites," accessed at https://www.virbela.com/teamsuites, accessed on Oct. 1, 2020; 26 pages.
Virtway Events, "Your 3D Space for Events," accessed at https://www.virtwavevents.com/, accessed on Oct. 28, 2020; 5 pages.
SaganWorks, "The World's First 3D Virtual Classroom," accessed at https://www.youtube.com/watch?v=DTmRfV-3vwc, YouTube video published on Jun. 26, 2020; 5 minutes 53 seconds (submitted on accompanying CD-ROM).
Spatial, "Collaborate from Anywhere in AR," accessed at https://www.youtube.com/watch?v=PG3tQY1Z6JQ, video published on Oct. 24, 2018; 2 minutes 15 seconds (submitted on accompanying CD-ROM).
vSpatial—Virtual Reality Offices, "Faster, Better, More Productive Than a Video Conference—You Can Do Work Together In VRI", accessed at https://www.youtube.com/watch?v=QtHsf-XxzrI, video published on Apr. 27, 2018; 5 minutes 9 seconds (submitted on accompanying CD-ROM).

\* cited by examiner

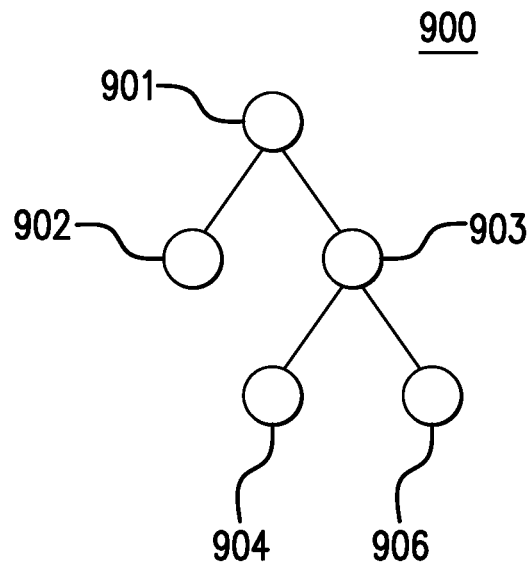
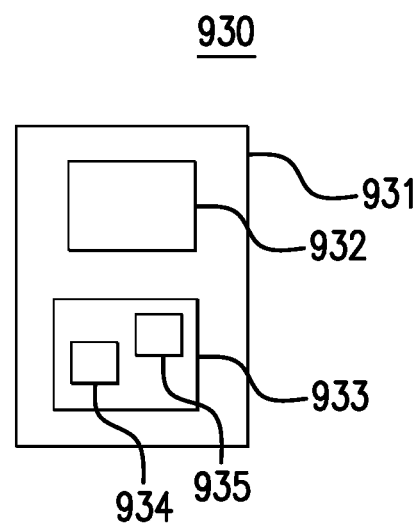
FIG. 9A
FIG. 9B
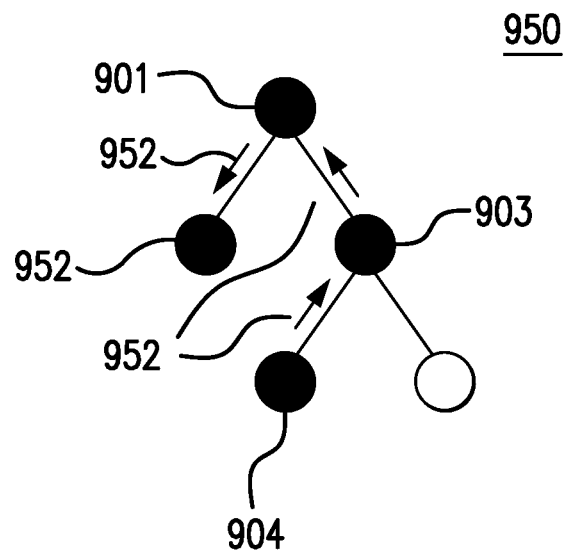
FIG. 9C

ADJUSTING RELATIVE LEFT-RIGHT SOUND TO PROVIDE SENSE OF AN AVATAR'S POSITION IN A VIRTUAL SPACE, AND APPLICATIONS THEREOF

BACKGROUND

Field

This field is generally related to videoconferencing.

Related Art

Video conferencing involves the reception and transmission of audio-video signals by users at different locations for communication between people in real time.

Videoconferencing is widely available on many computing devices from a variety of different services, including the ZOOM service available from Zoom Communications Inc. of San Jose, Calif. Some videoconferencing software, such as the FaceTime application available from Apple Inc. of Cupertino, Calif., comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user's devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Many workplaces, trade shows, meetings, conferences, schools, and places of worship have closed or encouraged people not to attend for fear of spreading disease, in particular COVID-19. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. In physical meeting conferences, people can have side conversations. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many Here, too, virtual conferences lose an opportunity for participants to create social connections and to communicate and network more effectively.

Moreover, due to limitations in the network bandwidth and computing hardware, when a lot of streams are placed in the conference, the performance of many videoconferencing systems begins to slow down. Many computing devices, while equipped to handle a video stream from a few participants, are ill-equipped to handle a video stream from a dozen or more participants. With many schools operating entirely virtually, classes of 25 can severely slow down the school-issued computing devices.

Massively multiplayer online games (MMOG, or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, Calif., and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable on videoconference. Some publications may describe having video placed on an avatar in a virtual world. However, these systems typically require specialized software and have other limitations that limit their usefulness.

Improved methods are needed for videoconferencing.

BRIEF SUMMARY

In an embodiment, a computer-implemented method provides audio for a virtual conference including a plurality of participants. In the method, a three-dimensional virtual space including an avatar with texture mapped video of a second user is rendered, from a perspective of a virtual camera of a first user, for display to the first user. The virtual camera is at a first position in the three-dimensional virtual space and the avatar at a second position in the three-dimensional virtual space. An audio stream from a microphone of a device of the second user is received. The microphone was positioned to capture speech of the second user. Volume of the received audio stream is adjusted to determine a left audio stream and a right audio stream to provide a sense of where the second position is in the three-dimensional virtual space relative to the first position. The left audio stream and the right audio stream are output to be played to the first user in stereo.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 9A-C are diagrams illustrating traversing a hierarchy of volume areas in a virtual environment during a videoconference.

The drawing in which an element first appears is typically indicated by the leftmost digit or digits in the corresponding reference number. In the drawings, like reference numbers may indicate identical or functionally similar elements.

DETAILED DESCRIPTION

Video Conference with Avatars in a Virtual Environment

Figure 1:
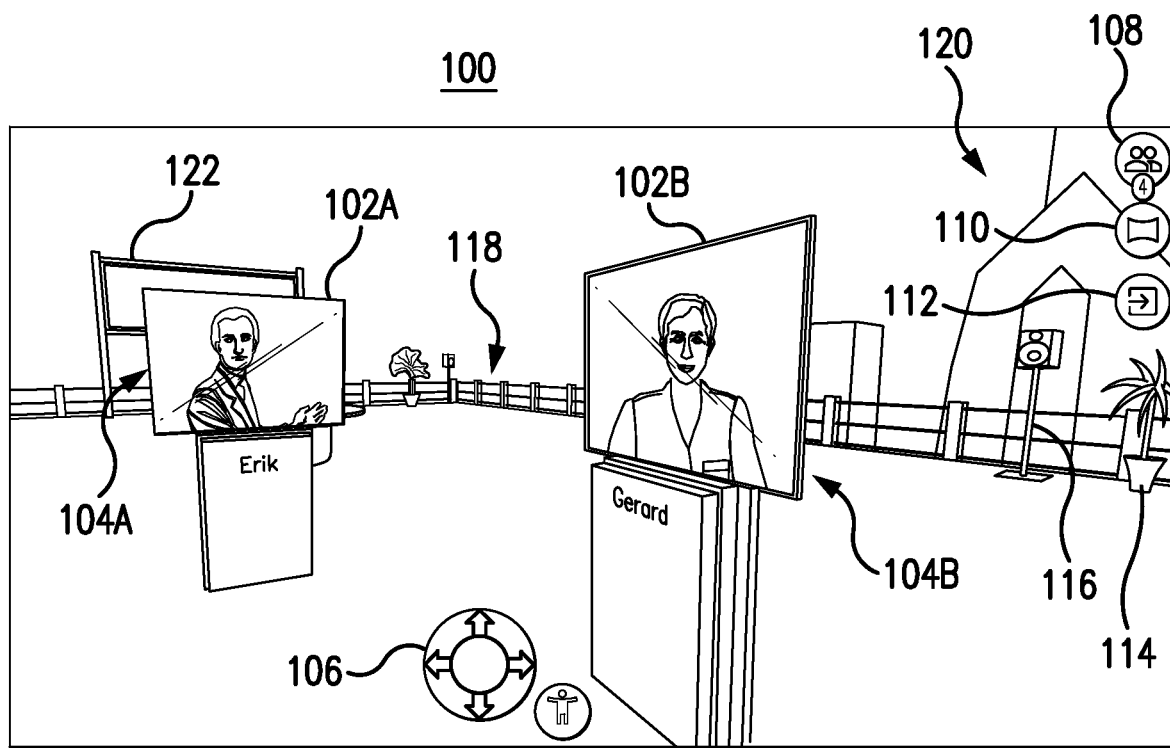
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an embodiment, different inputs may change the virtual camera's X and Y position and pan and tilt angles in the virtual environment. In further embodiments, a user may use inputs to alter height (the Z coordinate) or yaw of the virtual camera. In still further embodiments, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward backward left right on an X-Y plane, a space bar key to "hop" the virtual camera, and mouse movements specifying changes in pan and tilt angles.

Interface 100 includes avatars 102A and B, which each represent different participants to the videoconference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as model 118, these models can be represented using any mathematical way to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music, as will be described in greater detail below with respect to FIGS. 5 and 7. Presentation screen model 122 can serve to provide an outlet to present a presentation. Video of the presenter or a presentation screen share may be texture mapped onto presentation screen model 122.

Button 108 may provide the user a list of participants. In one example, after a user selects button 108, the user could chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of its surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, embodiments provide a more social experience than conventional web conferencing or conventional MMO gaming That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, Calif.), flea markets, garage sales, travel agencies, banks, archives, computer process management, fencing/swordfighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective that a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, special ops), and making reservations (e.g., for a certain holiday home/car/etc.)

Figure 2:
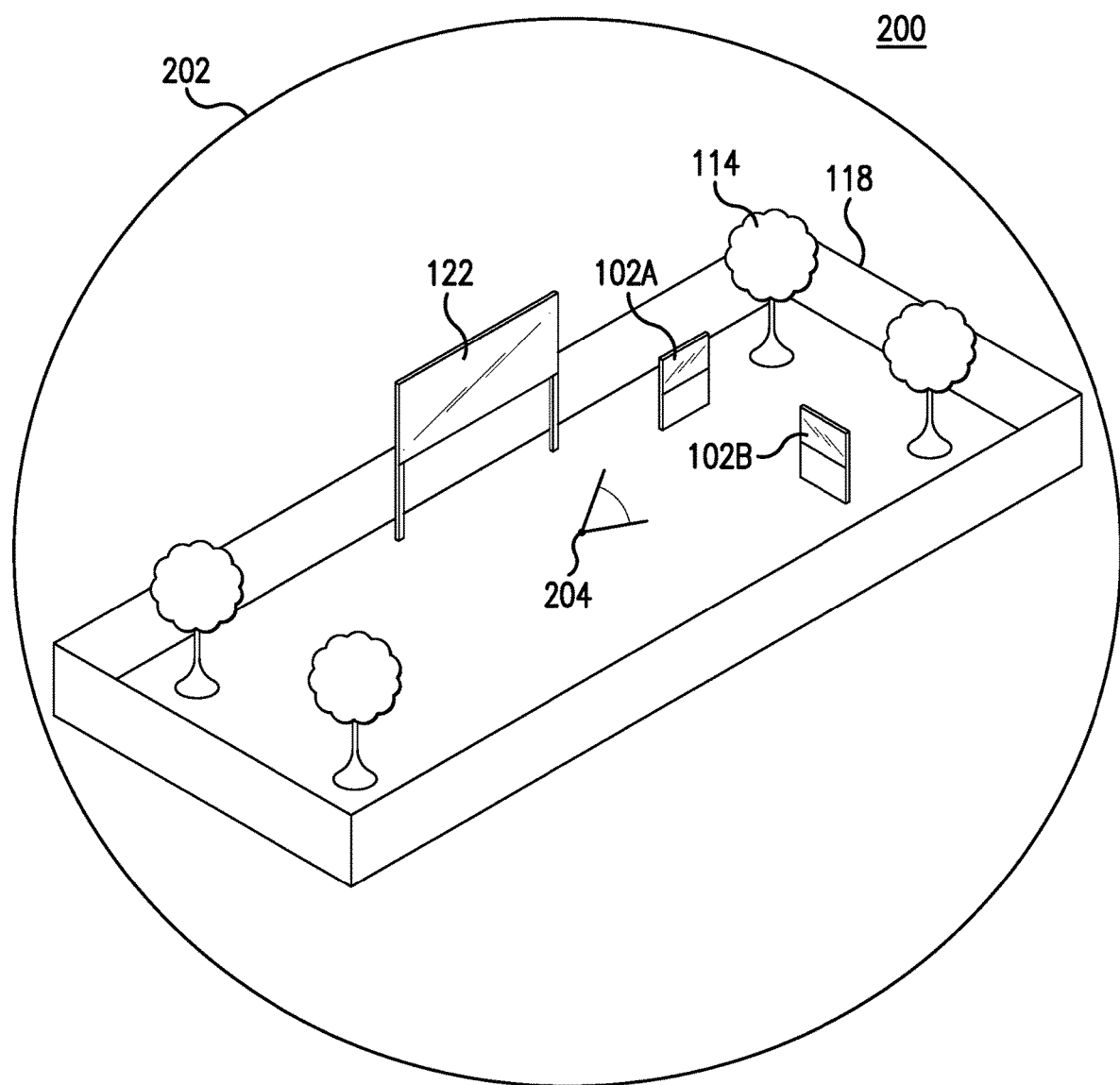
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within in the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other embodiments, other shapes instead of sphere 202 may be used to texture map the background image. In various alternative embodiments, the shape may be a cylinder, cube, rectangular prism, or any other three-dimensional geometry.

Figure 3:
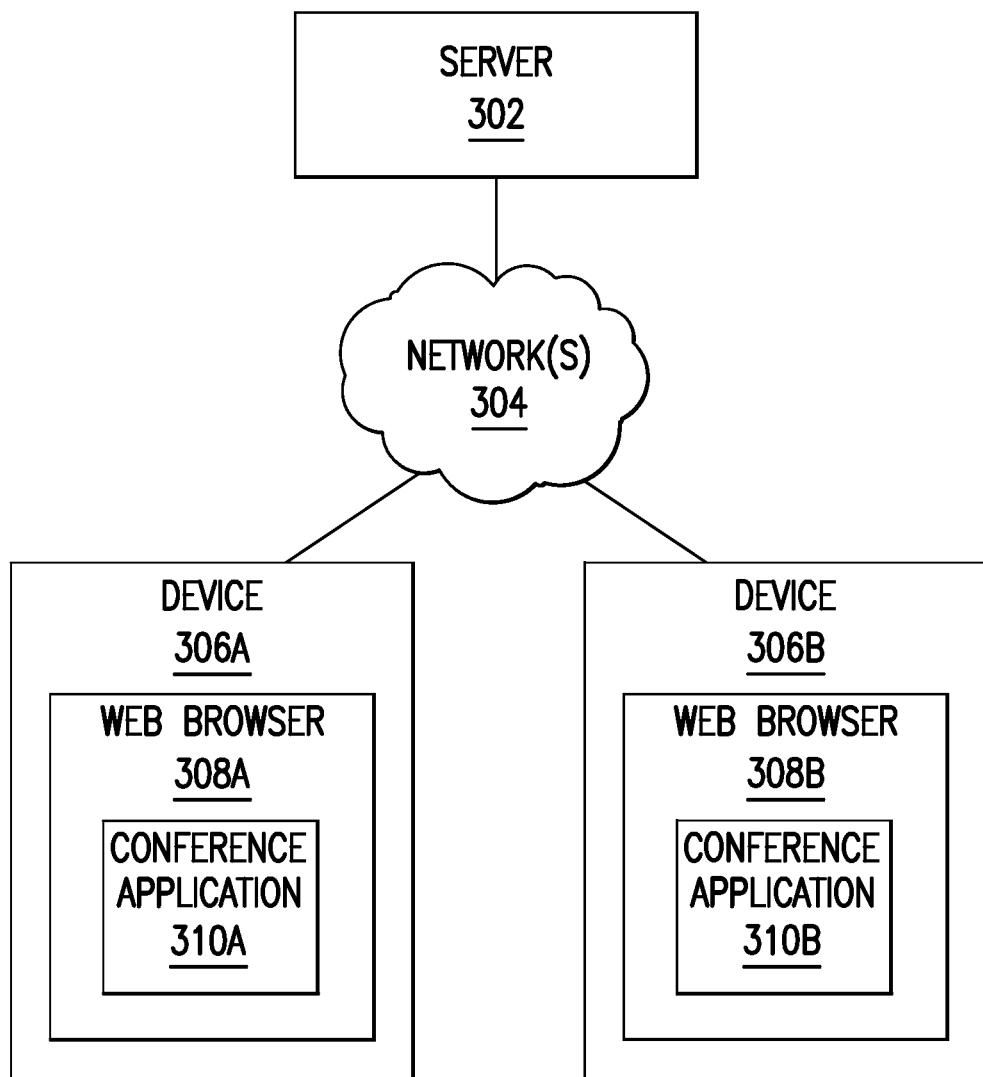
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative embodiment, communication between devices 306A-B happens not through server 302 but on a peer-to-peer basis. In that embodiment, one or more of the data describing the respective participants' location and direction, the notifications regarding new and exiting participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, or a tablet computer, or wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 308A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an embodiment, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three three-dimensional modeling data, including data describing the three-dimensional environment and data representing the respective participant avatars. This rendering may involve rasterization, texture mapping, ray tracing, shading, or other rendering techniques. In an embodiment, the rendering may involve ray tracing based on the characteristics of the virtual camera. Ray tracing involves generating an image by tracing a path of light as pixels in an image plane and simulating the effects of his encounters with virtual objects. In some embodiments, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
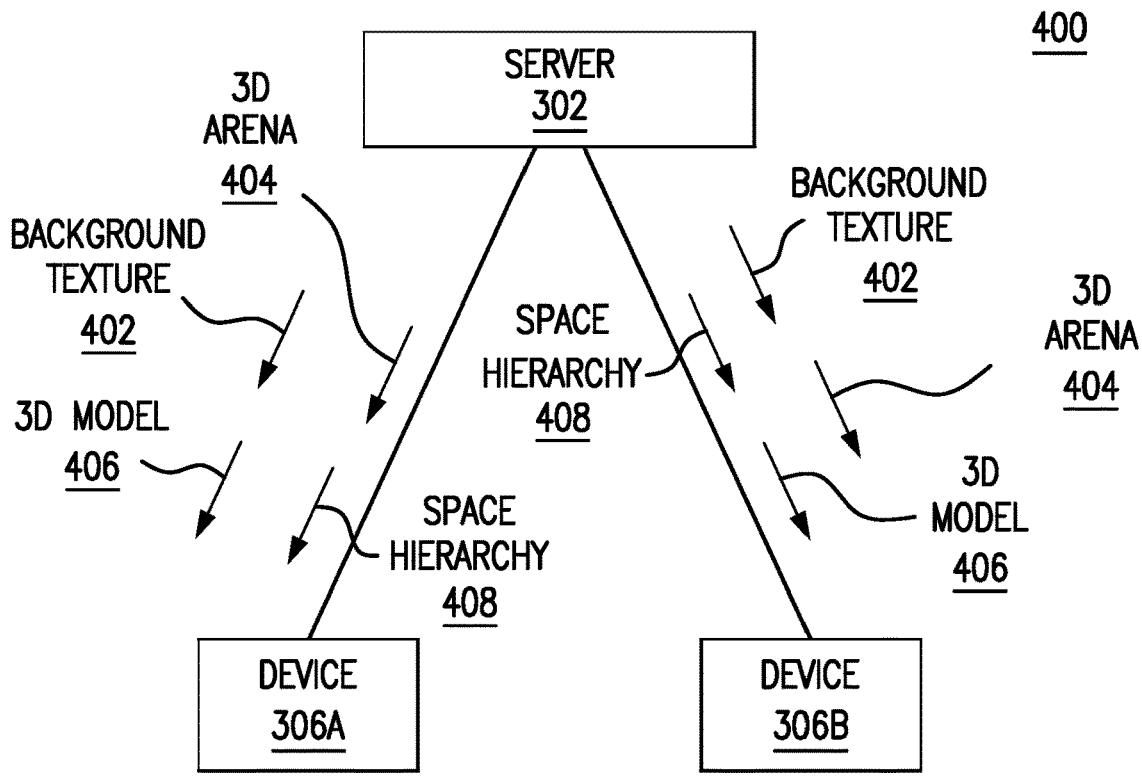
FIGS. 4A-C illustrate how data is transferred between various components of the system in FIG. 3 to provide videoconferencing.
Figure 4B:
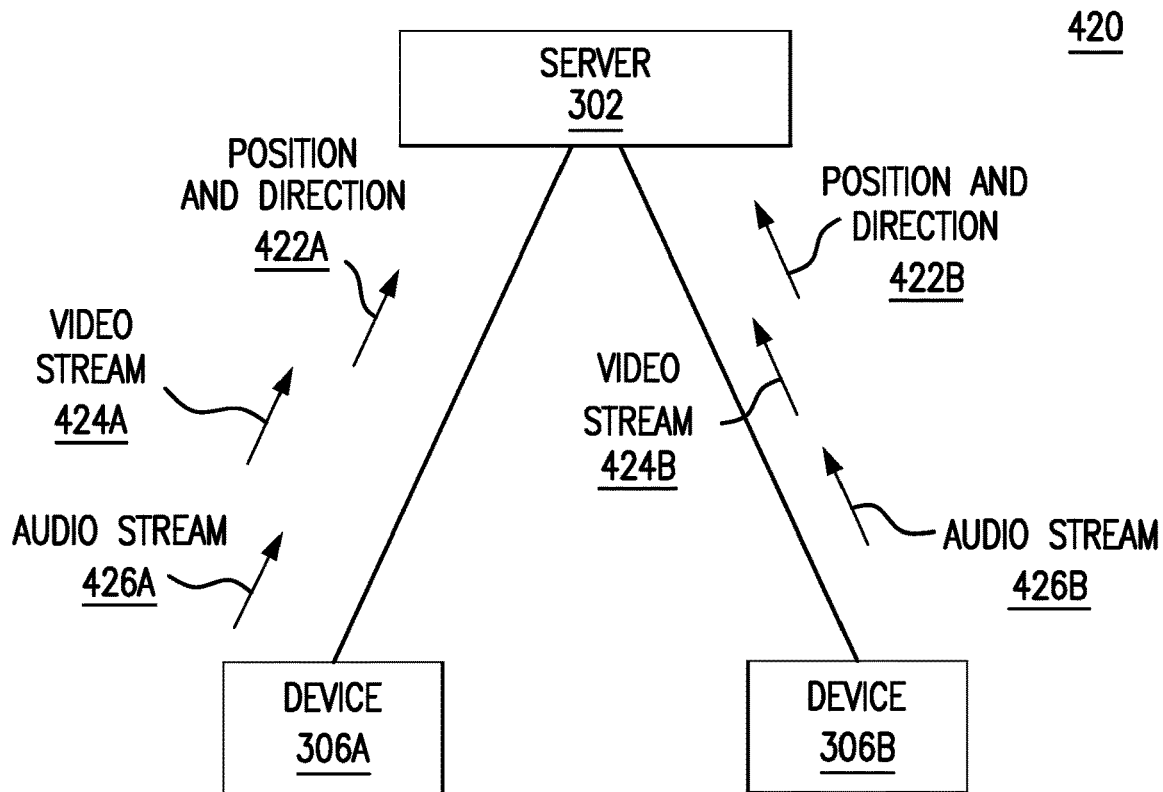
Figure 4C:
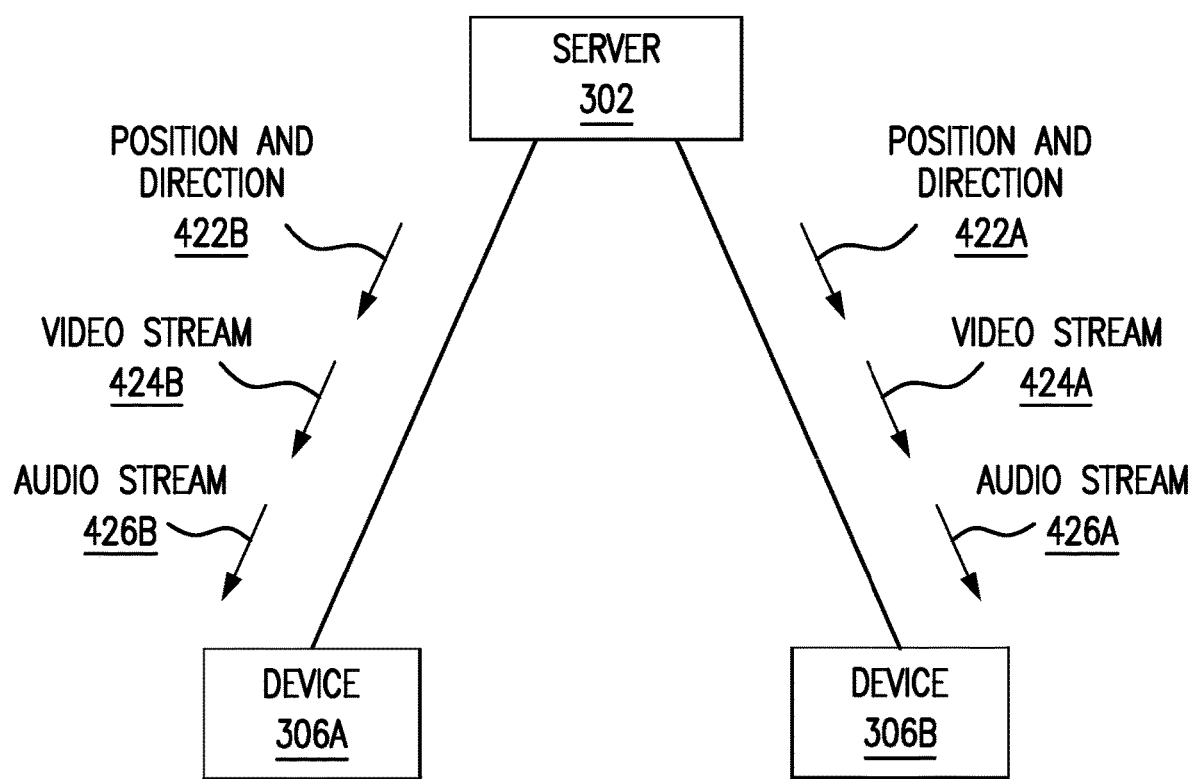

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and 306B. In particular, both devices 306A and 306B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular.

Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one embodiment, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 420 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user using device 306A. As described above, the position may be a coordinate in three-dimensional space (e.g., x, y, z coordinate) and the direction may be a direction in three-dimensional space (e.g., pan, tilt, roll). In some embodiments, the user may be unable to control the virtual camera's roll, so the direction may only specify pan and tilt angles. Similarly, in some embodiments, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping her avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, JP8, or H264. The video may be captured and transmitted in real time.

Similarly, audio stream 426A-B is audio data captured from a microphone of the respective devices. The audio may be compressed. For example, the video may use any commonly known audio codecs, including MPEG-4 or vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some embodiments, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-C is illustrated with two devices for simplicity, a skilled artisan would understand that the techniques described herein can be extended to any number of devices. Also, while FIG. 3 in FIGS. 4A-C illustrates a single server 302, a skilled artisan would understand that the functionality of server 302 can be spread out among a plurality of computing devices. In an embodiment, the data transferred in FIG. 4A may come from one network address for server 302, while the data transferred in FIGS. 4B-C can be transferred to/from another network address for server 302.

In one embodiment, participants can set their webcam, microphone, speakers and graphical settings before entering the virtual conference. In an alternative embodiment, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Adjusting Volume for a Video Conference in a Virtual Environment

Embodiments also adjust volume to provide a sense of position and space within the virtual conference. This is illustrated, for example, in FIGS. 5-7, 8A-B and 9A-C, each of which is described below.

Figure 5:
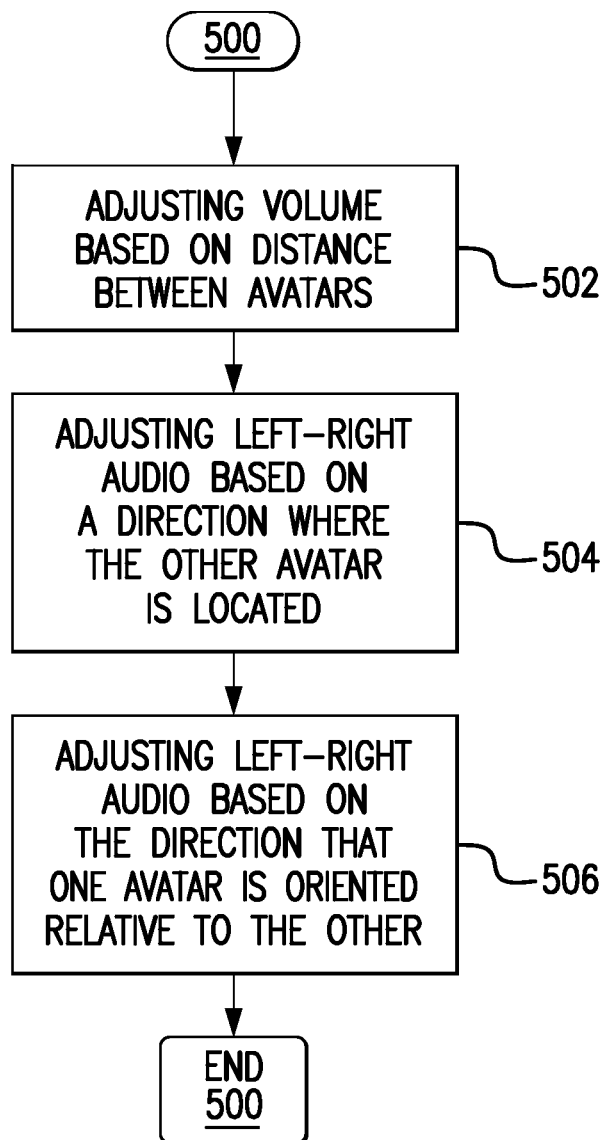
FIG. 5 is a flowchart illustrating a method for adjusting relative left-right volume to provide a sense of position in a virtual environment during a videoconference.

FIG. 5 is a flowchart illustrating a method 500 for adjusting relative left-right volume to provide a sense of position in a virtual environment during a videoconference.

At step 502, volume is adjusted based on distance between the avatars. As described above, an audio stream from a microphone of a device of another user is received. The volume of both the first and second audio streams is adjusted based on a distance between the second position to the first position. This is illustrated in FIG. 6.

Figure 6:
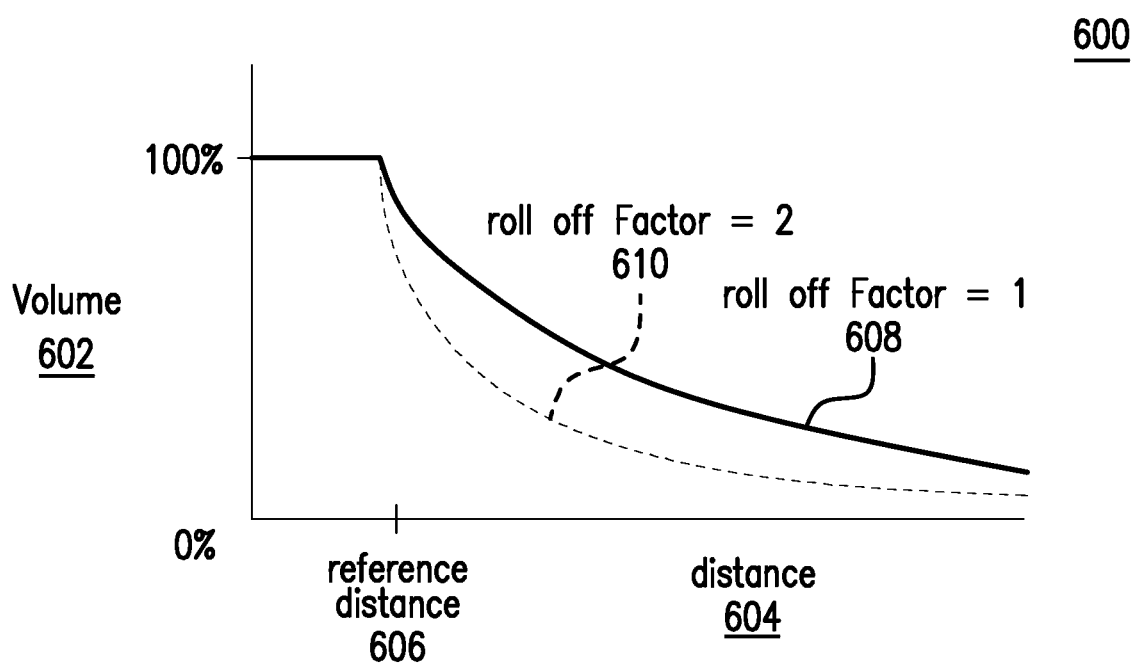
FIG. 6 is a chart illustrating how volume rolls off as distance between the avatars increases.

FIG. 6 shows a chart 600 illustrating how volume rolls off as distance between the avatars increases. Chart 600 illustrates volume 602 on its x-axis and y-axis. As distance between the users increases, the volume stays constant until a reference distance 602 is reached. At that point, volume begins to drop off. In this way, all other things being equal, a closer user will often sound louder than a farther user.

How fast the sound drops off depends on a roll off factor. This may be a coefficient built into the settings of the videoconferencing system or the client device. As illustrated by line 608 and line 610, a greater roll off factor will cause the volume to deteriorate more rapidly than a lesser one.

Returning to FIG. 5, at step 504, relative left-right audio is adjusted based on a direction where the avatar is located. That is, a volume of the audio to be output on the user's speaker (e.g., headset) will vary to provide a sense of where the speaking user's avatar is located. The relative volume of the left and right audio streams are adjusted based on a direction of a position where the user generating the audio stream is located (e.g., the location of the speaking user's avatar) relative to a position where the user receiving the audio is located (e.g., the location of the virtual camera). The positions may be on a horizontal plane within the three-dimensional virtual space. The relative volume of the left and right audio streams to provide a sense of where the second position is in the three-dimensional virtual space relative to the first position.

For example, at step 504, audio corresponding to an avatar to the left of the virtual camera would be adjusted such that the audio is output on the receiving user's left ear at a higher volume than on the right ear. Similarly, audio corresponding to an avatar to the right of the virtual camera would be adjusted such that the audio is output on the receiving user's right ear at a higher volume than on the left ear.

At step 506, relative left-right audio is adjusted based on the direction that one avatar is oriented relative to the other. A relative volume of the left and right audio streams is adjusted based on an angle between the direction where the virtual camera is facing and a direction where the avatar is facing such that the angle being more normal tends to have a greater difference in volume between the left and right audio streams.

For example, when an avatar is directly facing the virtual camera, the relative left-right volume of the avatar's corresponding audio stream may not be adjusted at all in step 506. When the avatar is facing the left side of the virtual camera, the relative left-right volume of the avatar's corresponding audio stream may be adjusted so that left is louder than right. And, when the avatar is facing the right side of the virtual camera, the relative left-right volume of the avatar's corresponding audio stream may be adjusted so that right is louder than left.

In an example, the calculation in step 506 may involve taking the cross product of the angle where the virtual camera is facing and the angle where the avatar is facing. The angles may be the direction they are facing on a horizontal plane.

In an embodiment, a check may be conducted to determine the audio output device the user is using. If the audio output device is not a set of headphones or another type of speaker that provides a stereo effect, the adjustments in steps 504 and 506 may not occur.

Steps 502-506 are repeated for every audio stream received from every other participant. Based on the calculations in steps 502-506, a left and right audio gain is calculated for every other participant.

In this way, the audio streams for each participant are adjusted to provide a sense of where the participant's avatar is located in the three-dimensional virtual environment.

Not only are audio streams adjusted to provide a sense of where avatars are located, but in certain embodiments, audio streams can be adjusted to provide private or semi-private volume areas. In this way, the virtual environment enables users to have private conversations. Also, it enables users to mingle with one another and allow separate, side conversations to occur, something that's not possible with conventional videoconferencing software. This is illustrated for example in with respect to FIG. 7.

Figure 7:
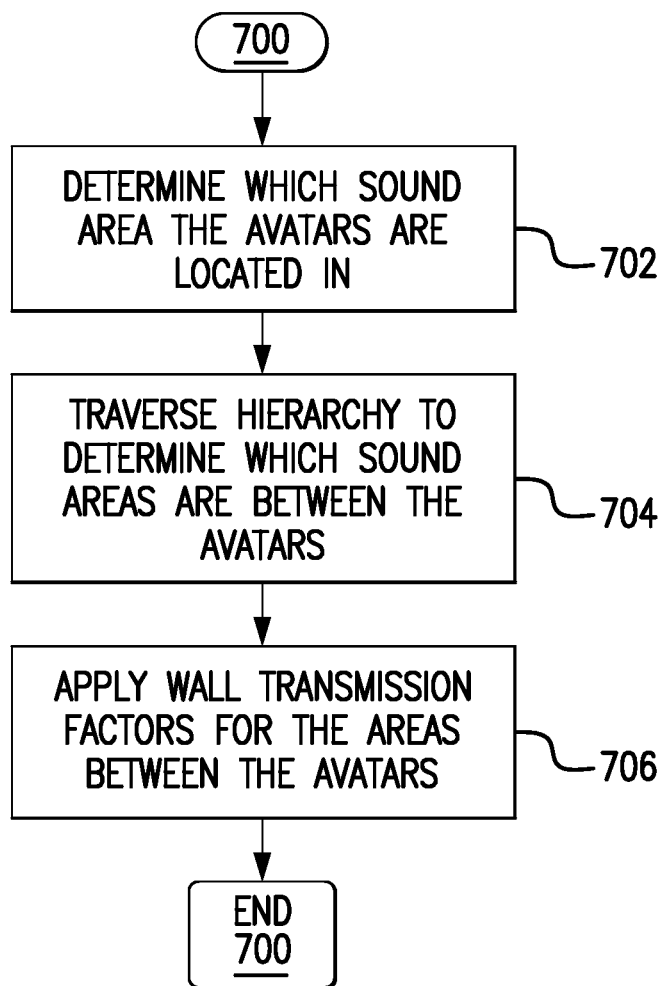
FIG. 7 is a flowchart illustrating a method for adjusting relative volume to provide different volume areas in a virtual environment during a videoconference.

FIG. 7 is a flowchart illustrating a method 700 for adjusting relative volume to provide different volume areas in a virtual environment during a videoconference.

As described above, the server may provide specification of sound or volume areas to the client devices. Virtual environment may be partitioned into different volume areas. At step 702, a device determines in which sound areas the respective avatars and the virtual camera are located.

Figure 8A:
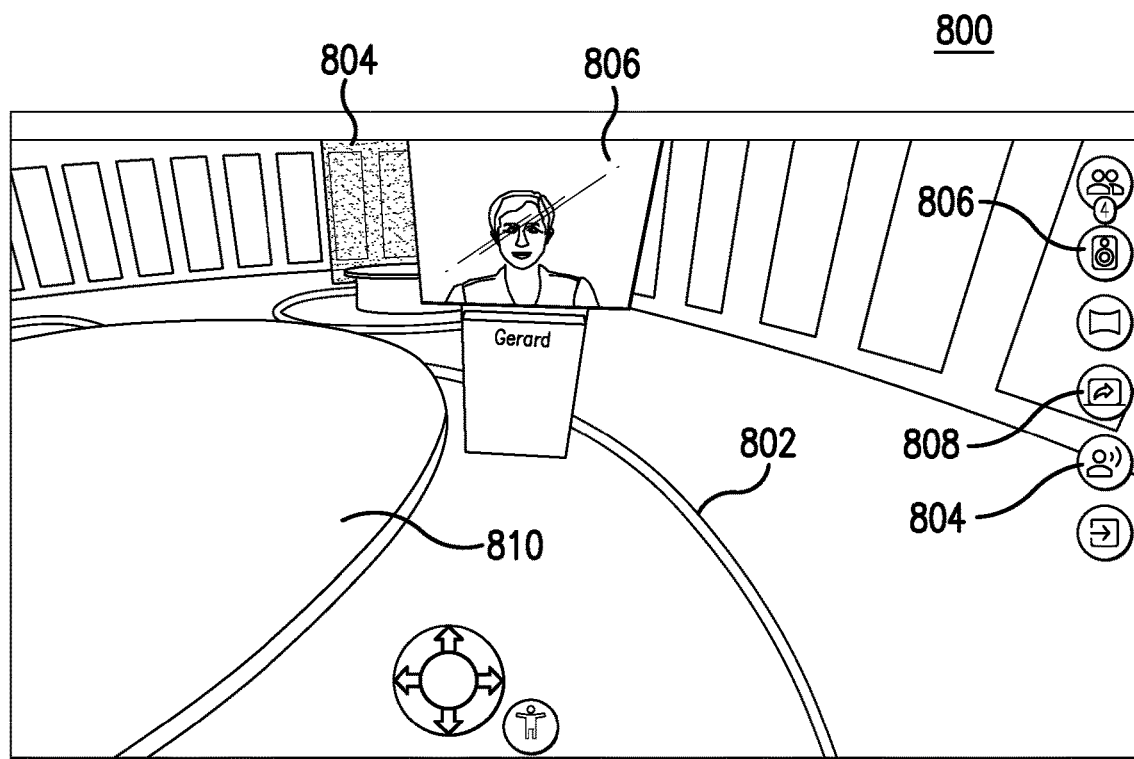
FIG. 8A-B are diagrams illustrating different volume areas in a virtual environment during a videoconference.
Figure 8B:
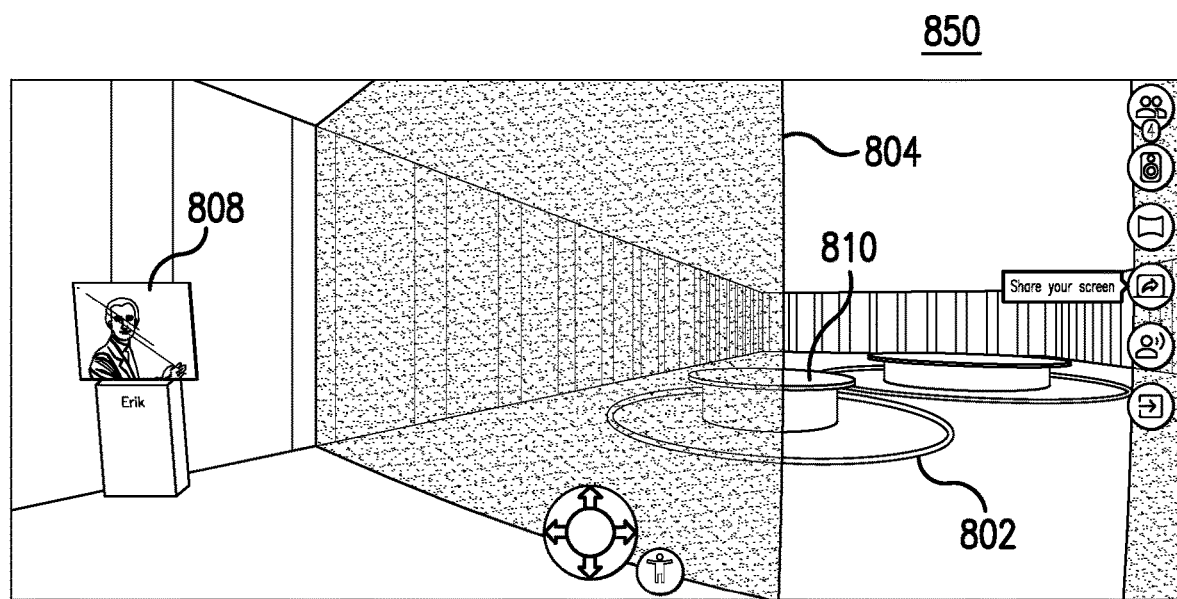

For example, FIGS. 8A-B are diagrams illustrating different volume areas in a virtual environment during a videoconference. FIG. 8A illustrates a diagram 800 with a volume area 802 that allows for a semi-private or side conversation between a user controlling avatar 806 and the user controlling the virtual camera. In this way, the users around conference table 810 can have a conversation without disturbing others in the room. The sound from the users controlling avatar 806 in the virtual camera may fall off as it exits volume area 802, but not entirely. That allows passersby to join the conversation if they'd like.

Interface 800 also includes buttons 804, 806, and 808, which will be described below.

FIG. 8B illustrates a diagram 800 with a volume area 804 that allows for a private conversation between a user controlling avatar 808 and the user controlling the virtual camera. Once inside volume area 804, audio from the user controlling avatar 808 and the user controlling the virtual camera may only be output to those inside volume area 804. As no audio at all is played from those users to others in the conference, their audio streams may not even be transmitted to the other user devices.

Volume spaces may be hierarchical as illustrated in FIGS. 9A and 9B. FIG. 9B is a diagram 930 shows a layout with different volume areas arranged in a hierarchy. Volume areas 934 and 935 are within volume area 933, and volume area 933 and 932 are within volume area 931. These volume areas are represented in a hierarchical tree, as illustrated in diagram 900 and FIG. 9A.

In diagram 900, node 901 represents volume area 931 and is the root of the tree. Nodes 902 and 903 are children of node 901, and represent volume areas 932 and 933. Nodes 904 and 906 are children of node 903, and represent volume areas 934 and 935.

If a user located in an area 934 is trying to listen to a user speaking who is located in area 932, the audio stream has to pass through a number of different virtual "walls," each attenuating the audio stream. In particular, the sound has to pass through the wall for area 932, the wall for area 933, and the wall for area 934. Each wall attenuates by particular factor. This calculation is described with respect to steps 704 and 706 in FIG. 7.

At step 704, the hierarchy is traversed to determine which various sound areas are between the avatars. This is illustrated, for example, in FIG. 9C. Starting from the node corresponding to the virtual area of the speaking voice (in this case node 904) a path to the node of the receiving user (in this case node 902) is determined. To determine the path, the links 952 going between the nodes are determined. In this way, a subset of areas between an area including the avatar and an area including the virtual camera is determined.

At step 706, the audio stream from the speaking user is attenuated based on respective wall transmission factors of the subset of areas. Each respective wall transmission factor specifies how much the audio stream is attenuated.

Additionally or alternatively, the different areas have different roll off factors in that case, the distance based calculation shown in method 600 may be applied for individual areas based on the respective roll off factors. In this way, different areas of the virtual environment project sound at different rates. The audio gains determined in the method as described above with respect to FIG. 5 may be applied to the audio stream to determine left and right audio accordingly. In this way, both wall transmission factors, roll off factors, and left-right adjustments to provide a sense of direction for the sound may be applied together to provide a comprehensive audio experience.

Different audio areas may have different functionality. For example, a volume area may be a podium area. If the user is located in the podium area, some or all of the attenuation described with respect to FIG. 5 or 7 may not occur. For example, no attenuation may occur because of roll off factors or wall transmission factors. In some embodiments, the relative left-right audio may still be adjusted to provide a sense of direction.

For exemplary purposes, the methods described with respect to FIGS. 5 and 7 are describing audio streams from a user who has a corresponding avatar. However, the same methods may be applied to other sound sources, other than avatars. For example, the virtual environment may have three-dimensional models of speakers. Sound may be emitted from the speakers in the same way as the avatar models described above, either because of a presentation or just to provide background music.

As mentioned above, wall transmission factors may be used to isolate audio entirely. In an embodiment, this can be used to create virtual offices. In one example, each user may have in their physical (perhaps home) office a monitor displaying the conference application constantly on and logged into the virtual office. There may be a feature that allows the user to indicate whether he's in the office or should not be disturbed. If the do-not-disturb indicator is off, a coworker or manager may come around within the virtual space and knock or walk in as they would in a physical office. The visitor may be able to leave a note if the worker is not present in her office. When the worker returns, she would be able to read the note left by the visitor. The virtual office may have a whiteboard and/or an interface that displays messages for the user. The messages may be email and/or from a messaging application such as the SLACK application available from Slack Technologies, Inc. of San Francisco, Calif.

Users may be able to customize or personalize their virtual offices. For example, they may be able to put up models of posters or other wall ornaments. They may be able to change models or orientation of desks or decorative ornaments, such as plantings. They may be able to change lighting or view out the window.

Turning back to FIG. 8A, the interface 800 includes various buttons 804, 806, and 808. When a user presses the button 804, the attenuation described above with respect to the methods in FIGS. 5 and 7 may not occur, or may occur only in smaller amounts. In that situation, the user's voice is output uniformly to other users, allowing for the user to provide a talk to all participants in the meeting. The user video may also be output on a presentation screen within the virtual environment as well, as will be described below. When a user presses the button 806, a speaker mode is enabled. In that case, audio is output from sound sources within the virtual environment, such as to play background music. When a user presses button 808, a screen share mode may be enabled, enabling the user to share contents of a screen or window on their device with other users. The contents may be presented on a presentation model. This too will be described below.

Presenting in a Three-Dimensional Environment

Figure 10:
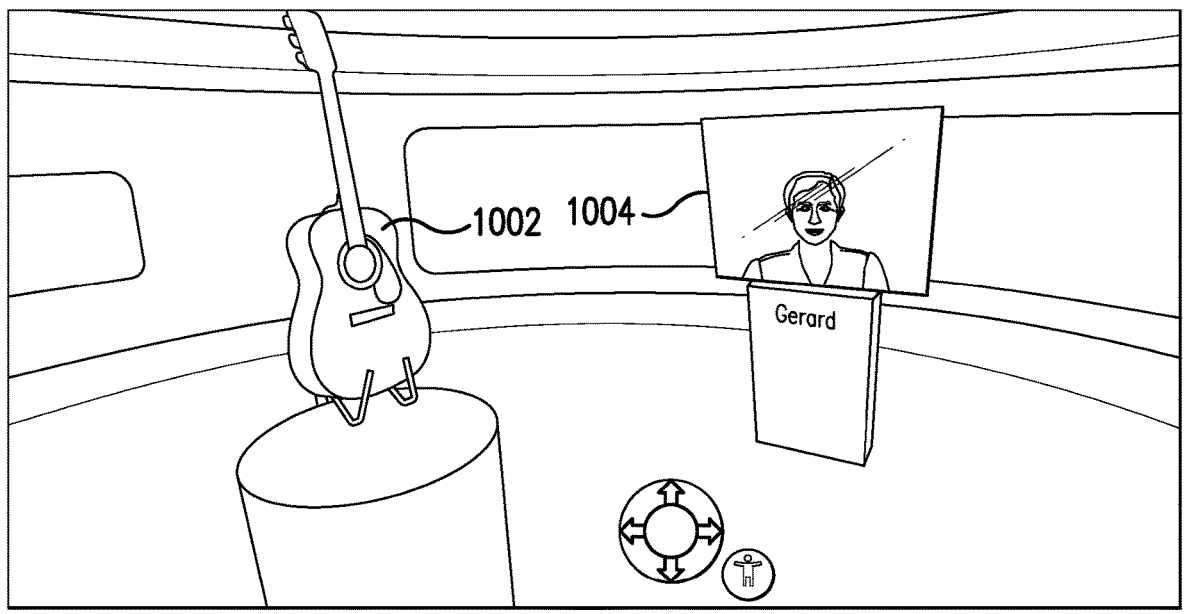
FIG. 10 illustrates an interface with a three-dimensional model in a three-dimensional virtual environment.

FIG. 10 illustrates an interface 1000 with a three-dimensional model 1004 in a three-dimensional virtual environment. As described above with respect to FIG. 1, interface 1000 may be displayed to a user who can navigate around the virtual environment. As illustrated in interface 1000, the virtual environment includes an avatar 1004 and a three-dimensional model 1002.

Three-dimensional model 1002 is a 3D model of a product which is placed inside a virtual space. People are able to join this virtual space to observe the model, and can walk around it. The product may have localized sound to enhance the experience.

More particularly, when the presenter in a virtual space wants to show a 3D model, they select the desired model from the interface. This sends a message to the server to update the details (including the name and path of the model). This will be automatically communicated to clients. In this way, a three-dimensional model may be rendered for display simultaneously with presenting the video stream. Users can navigate the virtual camera around the three-dimensional model of the product.

In different examples, the object may be a product demonstration, or may be an advertisement for a product.

Figure 11:
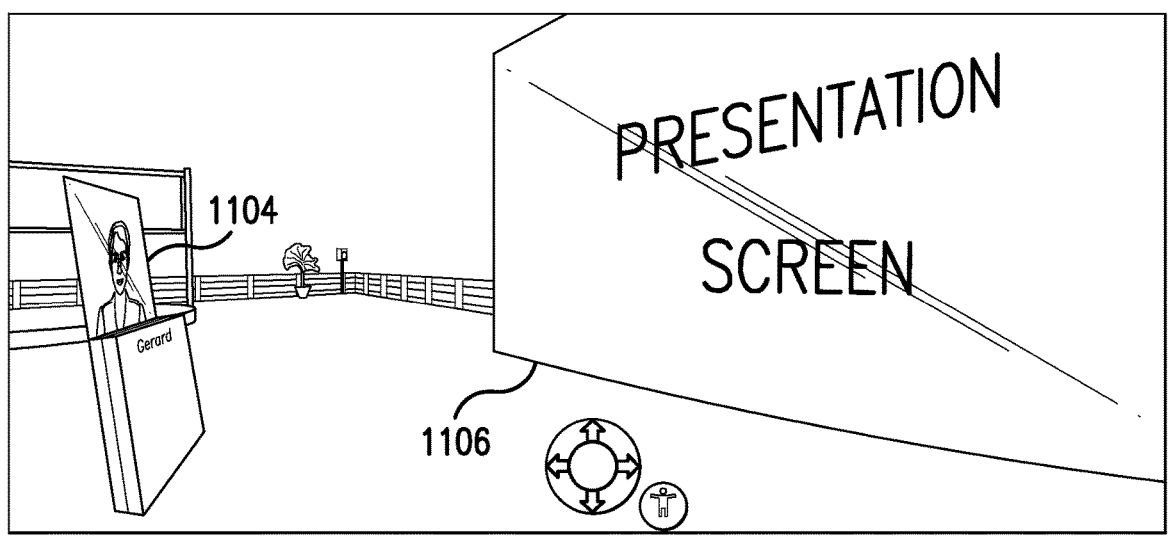
FIG. 11 illustrates a presentation screen share in a three-dimensional virtual environment used for videoconferencing.

FIG. 11 illustrates an interface 1100 with a presentation screen share in a three-dimensional virtual environment used for videoconferencing. As described above with respect to FIG. 1, interface 1100 may be displayed to a user who can navigate around the virtual environment. As illustrated in interface 1100, the virtual environment includes an avatar 1104 and a presentation screen 1106.

In this embodiment, a presentation stream from a device of a participant in the conference is received. The presentation stream is texture mapped onto a three-dimensional model of a presentation screen 1106. In one embodiment, the presentation stream may be a video stream from a camera on user's device. In another embodiment, the presentation stream may be a screen share from the user's device, where a monitor or window is shared. Through screen share or otherwise, the presentation video and audio stream could also be from an external source, for example a livestream of an event. When the user enables presenter mode, the presentation stream (and audio stream) of the user is published to the server tagged with the name of the screen the user wants to use. Other clients are notified that a new stream is available.

The presenter may also be able to control the location and orientation of the audience members. For example, the presenter may have an option to select to re-arrange all the other participants to the meeting to be positioned and oriented to face the presentation screen.

An audio stream is captured synchronously with the presentation stream and from a microphone of the device of the first participant. The audio stream from the microphone of the user may be heard by other users as to be coming from presentation screen 1106. In this way, presentation screen 1106 may be a sound source as described above. Because the user's audio stream is projected from the presentation screen 1106, it may be suppressed coming from the user's avatar. In this way, the audio stream is outputted to play synchronously with display of the presentation stream on screen 1106 within the three-dimensional virtual space.

Allocating Bandwidth Based on Distance Between Users

Figure 12:
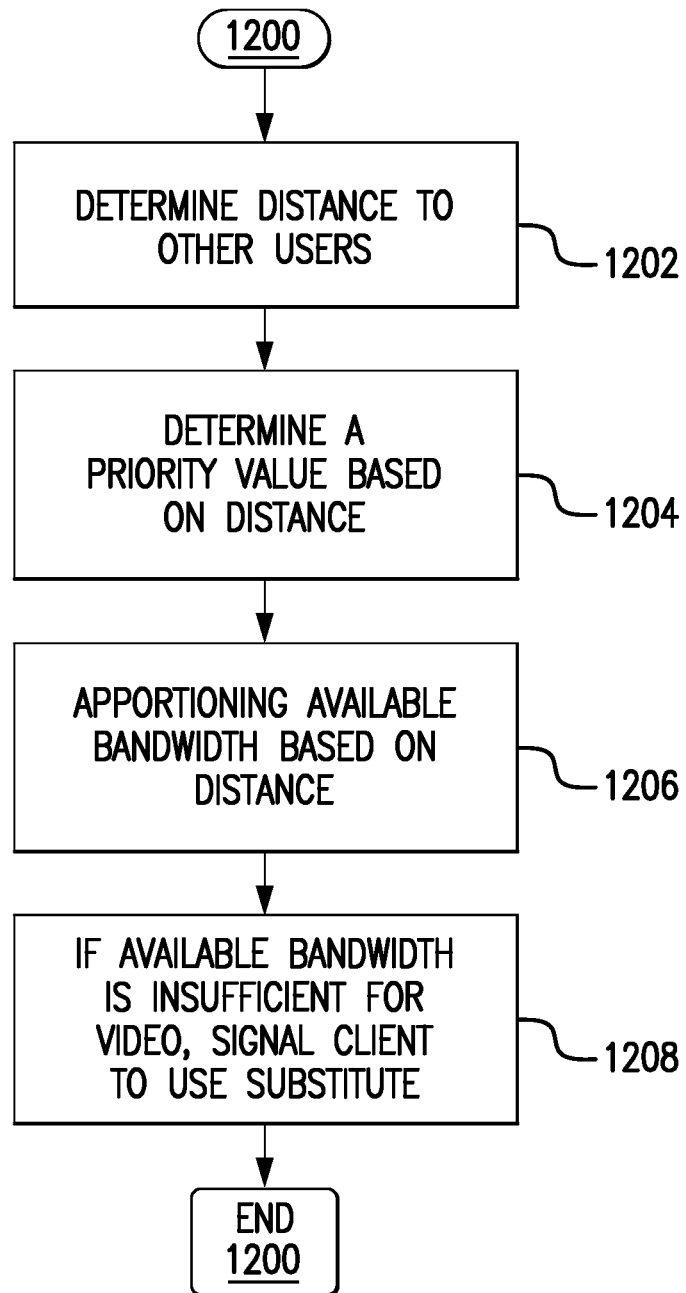
FIG. 12 is a flowchart illustrating a method for apportioning available bandwidth based on relative position of avatars within the three-dimensional virtual environment.

FIG. 12 is a flowchart illustrating a method 1200 for apportioning available bandwidth based on relative position of avatars within the three-dimensional virtual environment.

At step 1202, a distance is determined between a first user and a second user in a virtual conference space. The distance may be a distance between them on a horizontal plane in three-dimensional space.

At step 1204, received video streams are prioritized such that those of closer users are prioritized over video streams from farther ones. A priority value may be determined as illustrated in FIG. 13.

Figure 13:
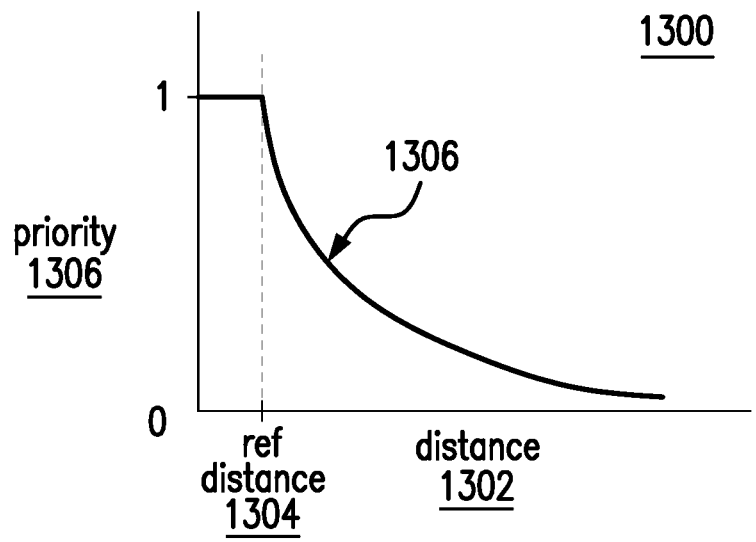
FIG. 13 is a chart illustrating how a priority value can fall off as distance between the avatars increases.

FIG. 13 shows a chart 1300 that shows a priority 1306 on the y-axis and a distance 1302. As illustrated by line 1306, priority state that maintains a constant level until a reference distance 1304 is reached. After the reference distance is reached, the priority starts to fall off.

At step 1206, the available bandwidth to the user device is apportioned between the various video streams. This may be done based on the priority values determined in step 1204. For example, the priorities may be proportionally adjusted so that all together they sum to 1. For any videos where insufficient bandwidth is available, the relative priority may be brought to zero. Then, the priorities are again adjusted for the remainder of the video streams. The bandwidth is allocated based on these relative priority values. In addition, bandwidth may be reserved for the audio streams. This is illustrated in FIG. 14.

Figure 14:
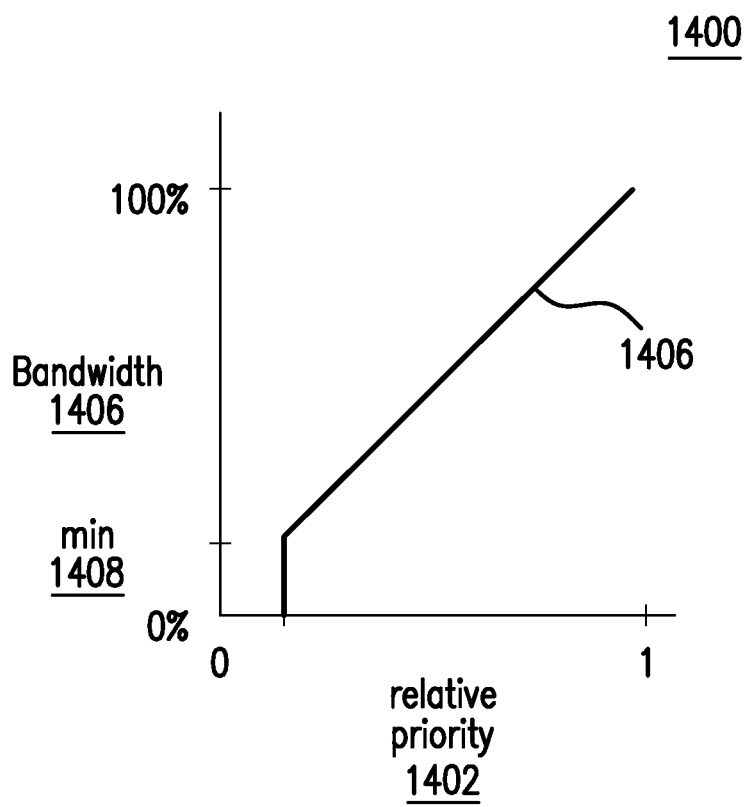
FIG. 14 is a chart illustrating how the bandwidth allocated can vary based on relative priority.

FIG. 14 illustrates a chart 1400 with a y-axis representing bandwidth 1406 and an x-axis representing relative priority. After a video is allocated a minimum bandwidth 1406 to be effective, the bandwidth 1406 allocated to a video stream increases proportionally with its relative priority.

Once the allocated bandwidth is determined, the client may request the video from the server at the bandwidth/bitrate/frame rate/resolution selected and allocated for that video. This may start a negotiation process between the client and the server to begin streaming the video at the designated bandwidth. In this way, the available video and audio bandwidth is divided fairly over all users, where users with twice as much priority will get twice as much bandwidth.

In one possible implementation, using simulcast, all clients send multiple video streams to the server, with different bitrates and resolutions. Other clients can then indicate to the server which one of these streams they are interested in and would want to receive.

At step 1208, it is determined whether the bandwidth available between the first and second user in the virtual conference space is such that display of video at the distance is ineffective. This determination may be done by either the client or server. If by the client, then the client sends a message for the server to cease transmission of the video to the client. If it is ineffective, transmission of the video stream to the device of the second user is halted, and the device of the second user is notified to substitute a still image for the video stream. The still image may simply be the last (or one of the last) video frames received.

In one embodiment, a similar process may be executed for audio, reducing the quality given the size of the reserved portion for the audio. In another embodiment, each audio stream is given a consistent bandwidth.

In this way, embodiments increase performance for all users and for the server the video and audio stream quality can be reduced for users that are farther away and/or less important. This is not done when there is enough bandwidth budget available. The reduction is done in both bitrate and resolution. This improves video quality as the available bandwidth for that user can be utilized more efficiently by the encoder.

Independently from this, the video resolution is scaled down based on distance, with users that are twice as far away having half the resolution. In this way, resolution that is unnecessary, given limitations in screen resolution, may not be downloaded. Thus, bandwidth is conserved.

Figure 15:
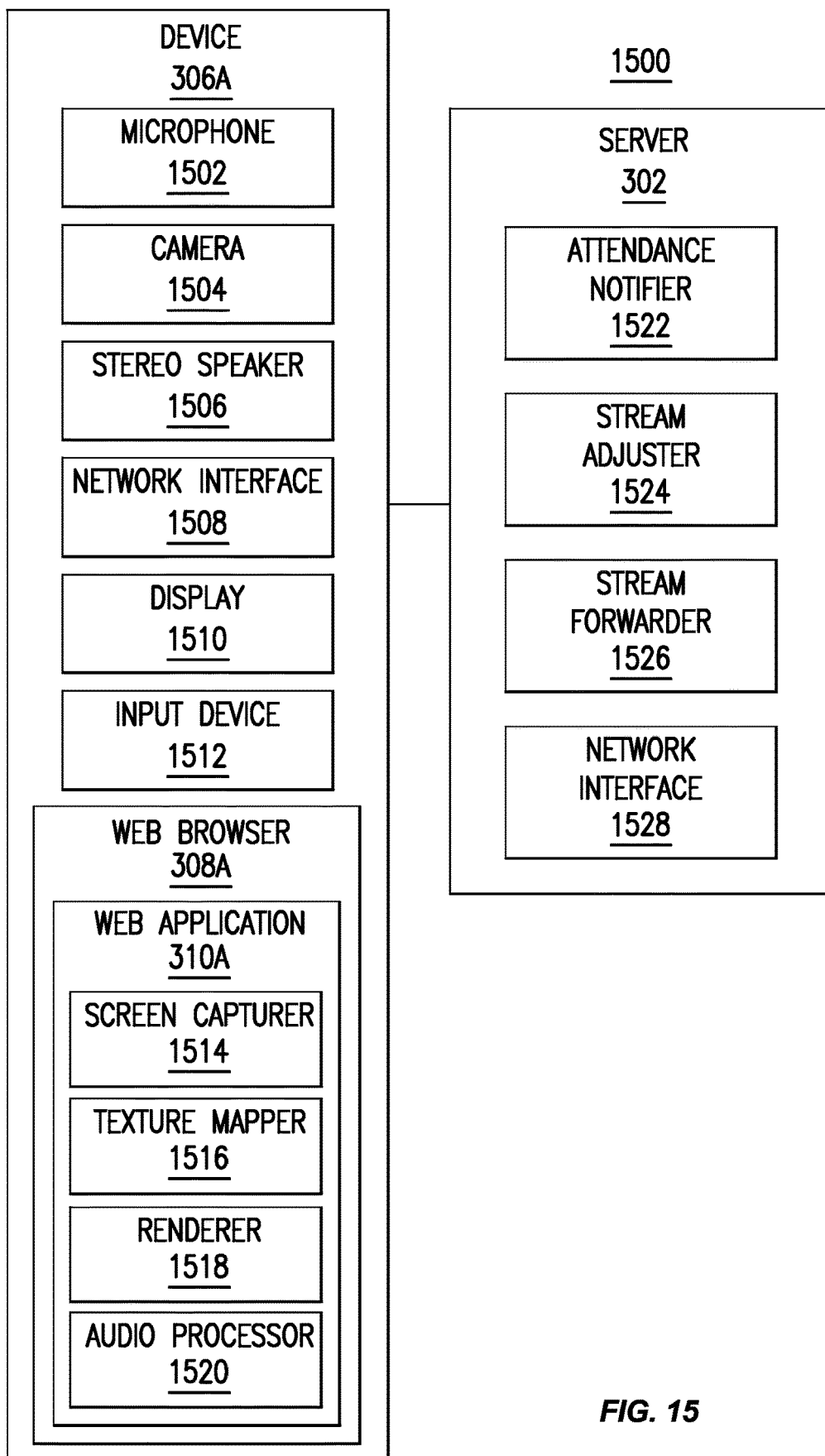
FIG. 15 is a diagram illustrating components of devices used to provide videoconferencing within a virtual environment.

FIG. 15 is a diagram of a system 1500 illustrating components of devices used to provide videoconferencing within a virtual environment. In various embodiments, system 1500 can operate according to the methods described above.

Device 306A is a user computing device. Device 306A could be a desktop or laptop computer, smartphone, tablet, or wearable (e.g., watch or head mounted device). Device 306A includes a microphone 1502, camera 1504, stereo speaker 1506, input device 1512. Not shown, device 306A also includes a processor and persistent, non transitory and volatile memory. The processors can include one or more central processing units, graphic processing units or any combination thereof.

Microphone 1502 converts sound into an electrical signal. Microphone 1502 is positioned to capture speech of a user of device 306A. In different examples, microphone 1502 could be a condenser microphone, electret microphone, moving-coil microphone, ribbon microphone, carbon microphone, piezo microphone, fiber-optic microphone, laser microphone, water microphone, or MEMs microphone.

Camera 1504 captures image data by capturing light, generally through one or more lenses. Camera 1504 is positioned to capture photographic images of a user of device 306A. Camera 1504 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 1504 captures images and videos.

Stereo speaker 1506 is a device which converts an electrical audio signal into a corresponding left-right sound. Stereo speaker 1506 outputs the left audio stream and the right audio stream generated by an audio processor 1520 (below) to be played to device 306A's user in stereo. Stereo speaker 1506 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1508 is a software or hardware interface between two pieces of equipment or protocol layers in a computer network. Network interface 1508 receives a video stream from server 302 for respective participants for the meeting. The video stream is captured from a camera on a device of another participant to the video conference. Network interface 1508 also received data specifying a three-dimensional virtual space and any models therein from server 302. For each of the other participants, network interface 1508 receives a position and direction in the three-dimensional virtual space. The position and direction are input by each of the respective other participants.

Network interface 1508 also transmits data to server 302. It transmits the position of device 306A's user's virtual camera used by renderer 1518 and it transmits video and audio streams from camera 1504 and microphone 1502.

Display 1510 is an output device for presentation of electronic information in visual or tactile form (the latter used for example in tactile electronic displays for blind people). Display 1510 could be a television set, computer monitor, head-mounted display, heads-up displays, output of a augmented reality or virtual reality headset, broadcast reference monitor, medical monitors mobile displays (for mobile devices), Smartphone displays (for smartphones). To present the information, display 1510 may include an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, quantum dot (QLED) display.

Input device 1512 is a piece of equipment used to provide data and control signals to an information processing system such as a computer or information appliance. Input device 1512 allows a user to input a new desired position of a virtual camera used by renderer 1518, thereby enabling navigation in the three-dimensional environment. Examples of input devices include keyboards, mouse, scanners, joysticks, and touchscreens.

Web browser 308A and web application 310A were described above with respect to FIG. 3. Web application 310A includes screen capturer 1514, texture mapper 1516, renderer 1518, and audio processor 1520.

Screen capturer 1514 captures a presentation stream, in particular a screen share. Screen capturer 1514 may interact with an API made available by web browser 308A. By calling a function available from the API, screen capturer 1514 may cause web browser 308A to ask the user which window or screen the user would like to share. Based on the answer to that query, web browser 308A may return a video stream corresponding to the screen share to screen capturer 1514, which passes it on to network interface 1508 for transmission to server 302 and ultimately to other participants' devices.

Texture mapper 1516 textures map the video stream onto a three-dimensional model corresponding to an avatar. Texture mapper 1516 May texture map respective frames from the video to the avatar. In addition, texture mapper 1516 may texture map a presentation stream to a three-dimensional model of a presentation screen.

Renderer 1518 renders, from a perspective of a virtual camera of the user of device 306A, for output to display 1510 the three-dimensional virtual space including the texture-mapped three-dimensional models of the avatars for respective participants located at the received, corresponding position and oriented at the direction. Renderer 1518 also renders any other three-dimensional models including for example the presentation screen.

Audio processor 1520 adjusts volume of the received audio stream to determine a left audio stream and a right audio stream to provide a sense of where the second position is in the three-dimensional virtual space relative to the first position. In one embodiment, audio processor 1520 adjusts the volume based on a distance between the second position to the first position. In another embodiment, audio processor 1520 adjusts the volume based on a direction of the second position to the first position. In yet another embodiment, audio processor 1520 adjusts the volume based on a direction of the second position relative to the first position on a horizontal plane within the three-dimensional virtual space. In yet another embodiment, audio processor 1520 adjusts the volume based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera. Finally, in yet another embodiment, audio processor 1520 adjusts the volume based on an angle between the direction where the virtual camera is facing and a direction where the avatar is facing such that the angle being more normal to where the avatar is facing tends to have a greater difference in volume between the left and right audio streams.

Audio processor 1520 can also adjust an audio stream's volume based on the area where the speaker is located relative to an area where the virtual camera is located. In this embodiment, the three-dimensional virtual space is segmented into a plurality of areas. These areas may be hierarchical. When the speaker and virtual camera are located in different areas, a wall transmission factor may be applied to attenuate the speaking audio stream's volume.

Server 302 includes an attendance notifier 1522, a stream adjuster 1524, and a stream forwarder 1526.

Attendance notifier 1522 notifies conference participants when participants join and leave the meeting. When a new participant joins the meeting, attendance notifier 1522 sends a message to the devices of the other participants to the conference indicating that a new participant has joined. Attendance notifier 1522 signals stream forwarder 1526 to start forwarding video, audio, and position/direction information to the other participants.

Stream adjuster 1524 receives a video stream captured from a camera on a device of a first user. Stream adjuster 1524 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 1524 prioritizes video streams of closer users over video streams from farther ones. Additionally or alternatively, stream adjuster 1524 may be located on device 306A, perhaps as part of web application 310A.

Stream forwarder 1526 broadcasts position/direction information, video, audio, and screen share screens received (with adjustments made by stream adjuster 1524). Stream forwarder 1526 may send information to the device 306A in response to a request from conference application 310A. Conference application 310A may send that request in response to the notification from attendance notifier 1522.

Network interface 1528 is a software or hardware interface between two pieces of equipment or protocol layers in a computer network. Network interface 1528 transmits the model information to devices of the various participants. Network interface 1528 receives video, audio, and screen share screens from the various participants.

Screen capturer 1514, texture mapper 1516, renderer 1518, audio processor 1520, attendance notifier 1522, a stream adjuster 1524, and a stream forwarder 1526 can each be implemented in hardware, software, firmware, or any combination thereof.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing a virtual conference including a plurality of participants, comprising:

from a perspective of a virtual camera of a first user, rendering for display to the first user a three-dimensional virtual space, the three-dimensional virtual space including an avatar with texture mapped video of a second user, the virtual camera at a first position in the three-dimensional virtual space and the avatar at a second position in the three-dimensional virtual space;

receiving an audio stream from a microphone of a device of the second user, the microphone positioned to capture speech of the second user; and adjusting a volume of the received audio stream to determine a left audio stream and a right audio stream to provide a sense of where the second position is in the three-dimensional virtual space relative to the first position; and outputting the left audio stream and the right audio stream to be played to the first user in stereo.

2. The method of claim 1, wherein the adjusting comprises adjusting a relative volume of the left and right audio streams based on a direction of the second position to the first position.

3. The method of claim 2, wherein the adjusting comprises adjusting the relative volume of the left and right audio streams based on a direction of the second position relative to the first position on a horizontal plane within the three-dimensional virtual space.

4. The method of claim 1, wherein the adjusting comprises adjusting a relative volume of the left and right audio streams based on a direction of the second position relative to the first position on a horizontal plane within the three-dimensional virtual space.

5. The method of claim 4, wherein the adjusting comprises adjusting the relative volume of the left and right audio streams based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera.

6. The method of claim 5, wherein the adjusting comprises adjusting the relative volume of the left and right audio streams based on an angle between the direction where the virtual camera is facing and a direction where the avatar is facing such that the angle being more normal to where the avatar is facing tends to have a greater difference in volume between the left and right audio streams.

7. The method of claim 1, wherein the adjusting comprises adjusting volumes of both the first and second audio streams based on a distance between the second position and the first position.

8. A non-transitory, tangible computer-readable device having instructions stored thereon that, when executed by at least one computing device, causes the at least one computing device to perform operations for presenting in a virtual conference including a plurality of participants, the operations comprising:

from a perspective of a virtual camera of a first user, rendering for display to the first user a three-dimensional virtual space, the three-dimensional virtual space including an avatar with texture mapped video of a second user, the virtual camera at a first position in the three-dimensional virtual space and the avatar at a second position in the three-dimensional virtual space;

receiving an audio stream from a microphone of a device of the second user, the microphone positioned to capture speech of the second user; and adjusting a volume of the received audio stream to determine a left audio stream and a right audio stream to provide a sense of where the second position is in the three-dimensional virtual space relative to the first position; and outputting the left audio stream and the right audio stream to be played to the first user in stereo.

9. The device of claim 8, wherein the adjusting comprises adjusting a relative volume of the left and right audio streams based on a direction of the second position to the first position.

10. The device of claim 9, wherein the adjusting comprises adjusting relative the volume of the left and right audio streams based on a direction of the second position relative to the first position on a horizontal plane within the three-dimensional virtual space.

11. The device of claim 8, wherein the adjusting comprises adjusting relative a volume of the left and right audio streams based on a direction of the second position relative to the first position on a horizontal plane within the three-dimensional virtual space.

12. The device of claim 11, wherein the adjusting comprises adjusting the relative volume of the left and right audio streams based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera.

13. The device of claim 12, wherein the adjusting comprises adjusting the relative volume of the left and right audio streams based on an angle between the direction where the virtual camera is facing and a direction where the avatar is facing such that the angle being more normal to where the avatar is facing tends to have a greater difference in volume between the left and right audio streams.

14. The device of claim 8, wherein the adjusting comprises adjusting volumes of both the first and second audio streams based on a distance between the second position and the first position.

15. A system for providing a virtual conference including a plurality of participants, comprising:

a processor coupled to a memory;

a renderer, implemented on the processor, configured to render for display to a first user a three-dimensional virtual space from a perspective of a virtual camera of the first user the three- dimensional virtual space including an avatar with texture mapped video of a second user, the virtual camera at a first position in the three-dimensional virtual space and the avatar at a second position in the three-dimensional virtual space;

a network interface configured to receive an audio stream from a microphone of a device of the second user, the microphone positioned to capture speech of the second user;

an audio processor configured to adjust a volume of the received audio stream to determine a left audio stream and a right audio stream to provide a sense of where the second position is in the three-dimensional virtual space relative to the first position; and a stereo speaker that outputs the left audio stream and the right audio stream to be played to the first user in stereo.

16. The system of claim 15, wherein the audio processor is configured to adjust a relative volume of the left and right audio streams based on a direction of the second position to the first position.

17. The system of claim 16, wherein the audio processor is configured to adjust the relative volume of the left and right audio streams based on the direction of the second position to the first position on a horizontal plane within the three-dimensional virtual space.

18. The system of claim 15, wherein the audio processor is configured to adjust a relative volume of the left and right audio streams based on a direction of the second position relative to the first position on a horizontal plane within the three-dimensional virtual space.

19. The system of claim 18, wherein the audio processor is configured to adjust the elative volume of the left and right audio streams based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera.

20. The system of claim 15, wherein the audio processor is configured to adjust a relative volume of the left and right audio streams based on an angle between the direction where the virtual camera is facing and a direction where the avatar is facing such that the angle being more normal to where the avatar is facing tends to have a greater difference in volume between the left and right audio streams.

21. The system of claim 15, wherein the audio processor is configured to adjust volumes of both the first and second audio streams based on a distance between the second position and the first position.

\* \* \* \* \*